July 19, 1932.  H. L. FOSTER  1,868,353
ARTIFICIAL REFRIGERATING APPARATUS AND CABINET THEREFOR
Filed Aug. 23, 1928  3 Sheets-Sheet 1

INVENTOR.
Howard L. Foster
BY
ATTORNEY.

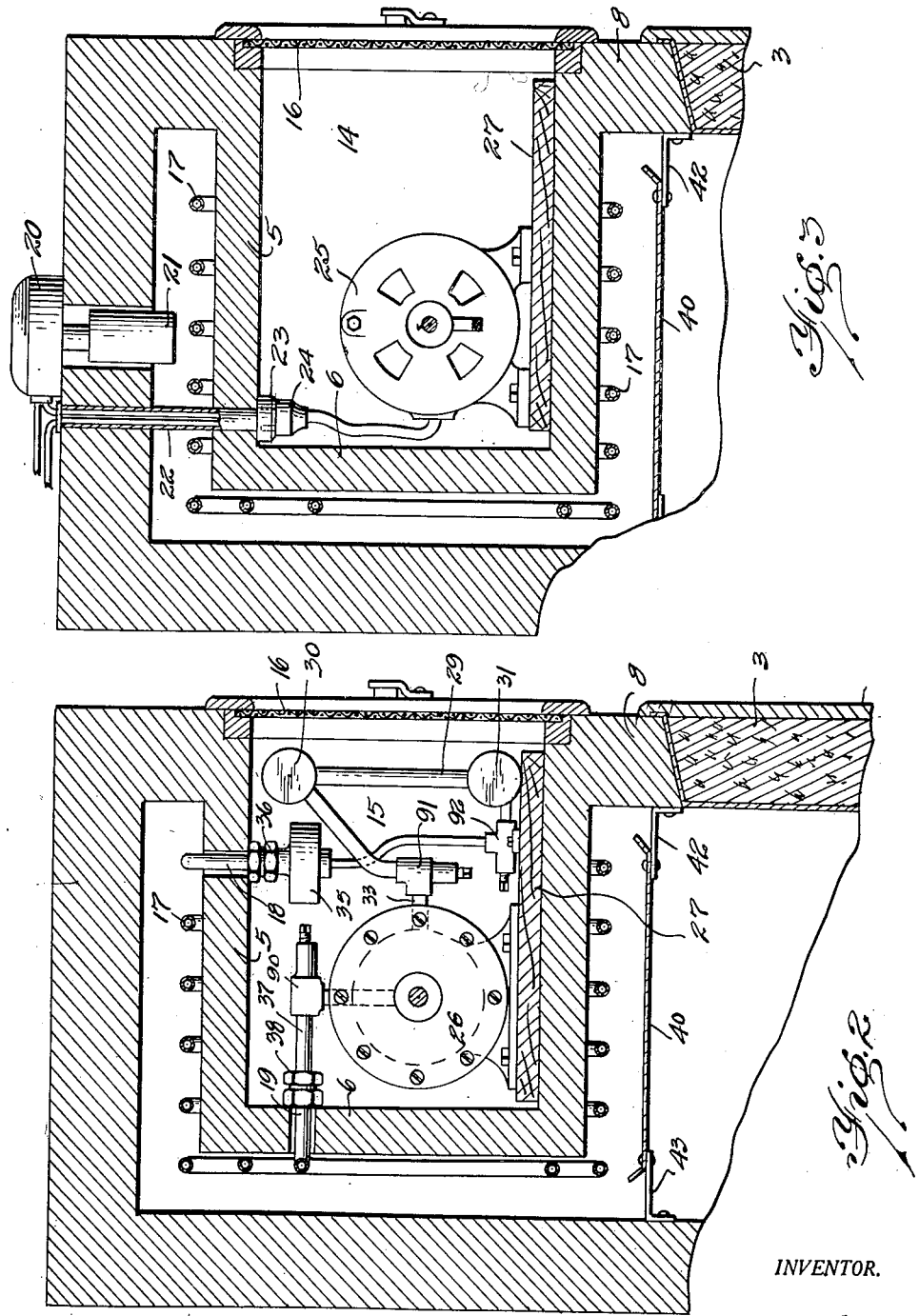

July 19, 1932.  H. L. FOSTER  1,868,353
ARTIFICIAL REFRIGERATING APPARATUS AND CABINET THEREFOR
Filed Aug. 23, 1928  3 Sheets-Sheet 3
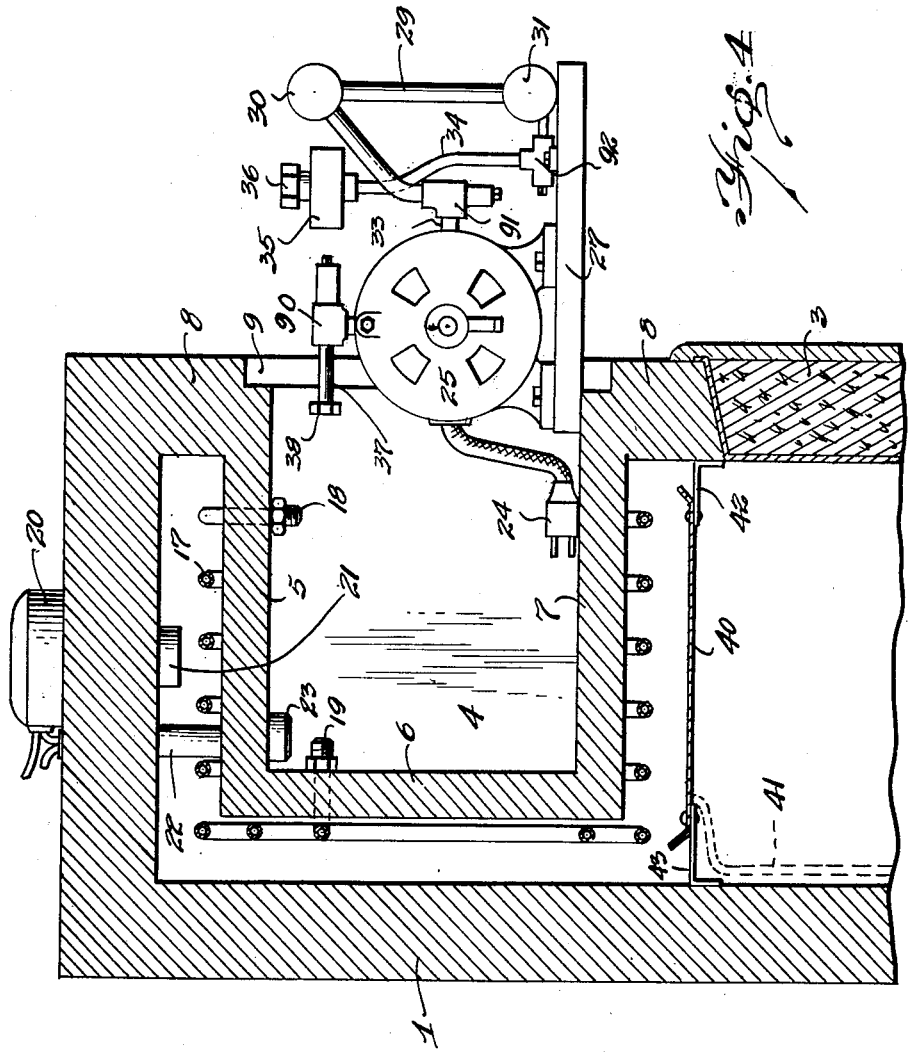
INVENTOR.
Howard L. Foster
BY
ATTORNEY.

Patented July 19, 1932

1,868,353

UNITED STATES PATENT OFFICE

HOWARD L. FOSTER, OF HUNTINGTON WOODS, MICHIGAN

ARTIFICIAL REFRIGERATING APPARATUS AND CABINET THEREFOR

Application filed August 23, 1928. Serial No. 301,453.

This invention relates to artificial refrigerating apparatus and cabinet therefor and the purpose of the invention is to provide an artificial refrigerating apparatus of the compressor-condenser-expander type in which the compressor, condenser, and heat dissipating elements are so mounted as to be removable from the cabinet in assembled relation upon disconnection of the heat absorbing element which is installed as a fixture in the cabinet in insulated relation with the removable portion of the apparatus.

A further and primary object of the invention is to provide a new form of cabinet that is particularly adapted for general manufacture by cabinet makers while manufacturers of the apparatus need only to provide detachable connections for the terminals of the heat absorbing element and electric circuit which may be separately mounted in the cabinet.

Any type of artificial refrigerating apparatus may be used with the cabinet as made according to my invention and with the commonly known compressor-condenser-expander type of apparatus herein shown as a typical installation all the mechanically operating parts including the motor, compressor, condenser, heat dissipating element etc., are to be mounted or housed within a chamber provided in the cabinet therefor and removable, preferably in assembled relation, from the chamber and may be transported to the factory for repair and another like apparatus inserted in place thereof while the repair is being made or permanently substituted for the original apparatus as may be found desirable.

To accomplish these general objects of the invention it is more convenient and less expensive to provide an air cooled apparatus and thereby avoid connection or disconnection of a water system to provide the heat dissipating element. If water cooled apparatus be utilized, however, the cabinet should be arranged to permit installation of the necessary water connections. With an air cooled apparatus as hereinafter described, I secure a simplified and comparatively inexpensive cabinet structure.

By my improved construction the cabinet including the reentrant chamber may be made by the cabinet manufacturer and shipped to the manufacturer of the apparatus who simply installs the apparatus therein making the proper connections for the electric circuit. The cabinet maker may also install the expansion coil at the time of manufacture of the cabinet, such coil being provided by the manufacturer for this purpose. The cabinet may therefore be of various sizes to accommodate apparatus of different overall dimensions and is not confined to the specific apparatus herein shown.

There are thus two problems arising in the manufacture and sale of artificial refrigerating apparatus—namely, a cabinet that is particularly adapted for use with artificial refrigerating apparatus and that can be made and sold by manufacturers of refrigerator cabinets to manufacturers of the apparatus without particular reference being had to the specific construction of the apparatus except as to its overall dimensions and the second is to provide for ready removal of the operating parts of the apparatus which are the most liable to require repair in order that the repair may be made at a point remote from the home of the user and substituting therefor a similar apparatus whereby the refrigerator may be maintained practically in continuous operation.

These and other objects and the several novel features of the invention are hereinafter described and claimed, and the preferred form of refrigerating cabinet and apparatus embodying my invention is shown in the accompanying drawings in which—

Fig. 2 is a section taken on line 2—2 of Fig. 1.

Fig. 3 is a section taken on line 3—3 of Fig. 1.

Fig. 4 is a section similar to Fig. 2 showing the apparatus partially removed from the cabinet.

Figure 1:
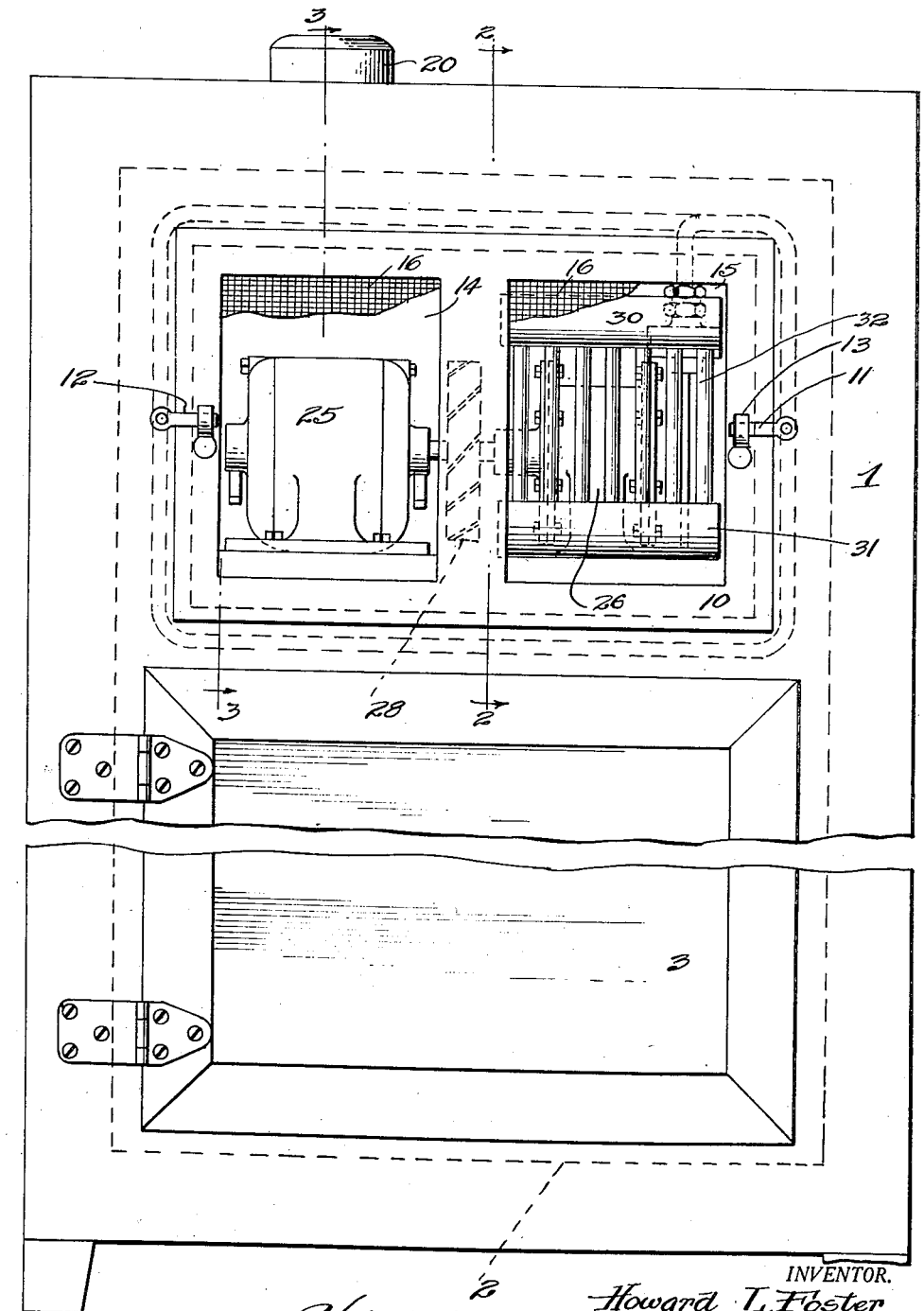
Fig. 1 is a front elevation of the refrigerator cabinet with an artificial refrigerating apparatus positioned therein.

The cabinet, indicated generally at 1, may have a number of chambers for the storage of food it being here shown as having a lower chamber 2 for such purpose closable by a door 3. As is usual the walls of the cabinet are formed of any desirable insulating material the character and general construction of which is not material to this invention. A feature of the cabinet construction consists in the provision of what I have termed a "re-entrant" chamber 4 at the top of the box or cabinet the walls of which are spaced from the surrounding walls of the cabinet as shown more particularly in Figs. 2, 3 and 4. This chamber is preferably formed by the walls 5, 6 and 7 providing a chamber of rectangular cross section open at its forward side to atmosphere.

The words "re-entrant chamber" as herein used refer to a chamber having an opening at one side and whose walls at that side are arranged in continuation with one wall of the refrigerator chamber into which it extends in spaced relation with the refrigerator walls.

The walls of the chamber 4 are formed in continuation of a wall of the cabinet here being shown as formed in continuation of the front vertical wall 8. This wall 8 is recessed, as indicated at 9, to receive a frame 10 which is insertable therein and when inserted it may be detachably secured in place by the pivoted latch members 11 and 12 which engage behind similar dogs 13 on the frame. This frame is provided with a pair of openings 14 and 15 which are preferably covered with a screen indicated at 16 in each instance.

Supported on the exterior of the re-entrant chamber 4, and therefore in the refrigerator chamber, is an expansion coil 17 or heat absorbing element having an inlet end 18 and an outlet 19 and extending through apertures provided in the walls 5 and 6 respectively into the chamber 4 for connection with the refrigerating apparatus as hereinafter described. As is also hereinafter more fully shown, the preferred motive power for the apparatus is an electric motor 25 and the cabinet may be built to include or have subsequently installed therein any adaptable electric switch indicated at 20 which is thermostatically controlled due to the control portion 21 thereof extending into the refrigerated space of the cabinet. The specific form of the switch and thermostatic control therefor is not a material element of this invention, any of the well known forms being available for the purpose.

In order that the apparatus may be readily removable it is preferable to provide the electric wiring extending into the cabinet through a conduit 22 and terminating within the chamber 4 in a socket 23 to which the plug 24 of the motor cord may be attached or detached upon assembly or disassembly of the apparatus and the cabinet and without disturbing the operating parts of the switch mechanism or apparatus.

The refrigerating apparatus shown is of the usual compressor-condenser-expander type having an electric motor 25 and the pump here illustrated is of the rotary type indicated at 26 and both may be mounted on the same base 27. Intermediate the motor and pump and on the shaft thereof is a fan indicated by dotted lines 28 in Fig. 1. Also mounted on this base is a condenser indicated generally at 29 consisting of the usual upper and lower headers 30, 31 and a series of condensing pipes 32 extending therebetween. The outlet line 33 of the compressor discharges to the condenser at the upper end and the lower end of the condenser is connected by means of a pipe 34 with the usual expansion valve to be understood as being in the chamber 35. The outlet to this valve chamber 35 is connected by means of a union 36 with the inlet 18 of the expansion coil. The intake line of the pump, indicated by the pipe 37, is adapted to be connected with the outlet or discharge end of the expansion coil 19 by means of the union 38. When these parts are assembled in their operative relationship, rotation of the motor and shaft causes operation of the compressor and rotation of the fan 28. The fan draws air through the screened aperture 15 in through and about the condenser and tubes and coil and pump and discharges the same across the motor and out through the screened aperture 14.

The compressor may be of any well known or adaptable form such for instance as are now in use in refrigerating apparatus, the specific compressor structure not being a material element of this invention. In fact the specific details of construction of any of the operative parts may be varied materially, the essential characteristic being that these operative parts are readily removable, preferably by being mounted upon a common base or support to permit handling as a unit in their assembled relationship. The condenser may be positioned adjacent either of the openings 14 or 15 without materially affecting the result except that the direction of flow of air may be altered. It will thus be seen that the motor, compressor, condenser and heat dissipating means are all associated together as a unit in the construction shown and are removable from the cabinet while the cabinet may be provided with the expansion coils or other form of heat absorbing element, thermostatic switch and connection for the plug of the motor cord.

With this preferred arrangement of parts it is only necessary to introduce the operative parts of the apparatus on the base 27 into the reentrant chamber, attach the unions 36 and 38 with the inlet and outlet 18 and 19 of the expansion coil and the plug 24 with the socket 23 and the refrigerator is in operative condition. Should the operating parts of the apparatus mounted on the base 27 require repair it is only necessary to disconnect these unions and plug and withdraw the apparatus from the cabinet and introduce another outfit of the same character. In the insertion or removal of the apparatus it is of course necessary to remove and replace the frame 10 having the screened openings 14 and 15.

The space between the walls of the reentrant chamber 4 and the walls of the cabinet is open to the lower portion of the cabinet closable by the door 3 and forms part of the refrigerated space of the cabinet. In the drawings I have shown a drip pan 40 below the chamber 4 and expansion coils 17 thereabout in order that any moisture may be prevented from falling onto stored food in the lower part of the refrigerator. This pan may have a pipe connected therewith to drain the deposited liquid from the cabinet such for instance as is indicated by dotted lines 41 in Fig. 4. The pan 40 is mounted on brackets 42 and 43 which are supported on the walls of cabinet after the manner shown in Fig. 4.

From the foregoing description it will be evident that a cabinet or refrigerator box made in the general manner described—that is, with a reentrant chamber that is a fixture so far as the cabinet is concerned by being formed integrally with the walls thereof or permanently attached thereto as the case may be and with expansion coils and electric control switch arranged in the general manner described—provides a cabinet that is well adapted for use with an artificial refrigerating apparatus of an overall dimension permitting the same to be introduced into the interior of the reentrant chamber. It is further to be noted that this cabinet may be utilized with any of a number of differently constructed units and is not confined to the specific form of unit described and thus manufacturers of cabinets could make this type of cabinet for various manufacturers of artificial refrigerating units should it be found desirable to so do.

It is further to be noted that manufacturers of cabinets may make this cabinet in its entirety without necessity of installing expansion coils or heat absorbing element therewith or the electric switch and plug for the circuit which are only required to be installed either by the cabinet maker or manufacturer when the type of artificial refrigerating apparatus is of the character illustrated, it being evident that any of the well known types of refrigerating apparatus and various forms thereof may be arranged to be housed in the reentrant chamber with the heat absorbing element to affect the temperature of the atmosphere of the cabinet exteriorly of the reentrant chamber. It is further to be noted that, while I have described a removable apparatus in assembled relation, such arrangement of the apparatus is not essential in the securing of the principal object of the invention as the apparatus may be housed within the reentrant chamber in any desired manner without departing from the broadest scope of the invention as outlined in a number of the appended claims.

A further feature of the invention—namely, the removable apparatus in conjunction with the cabinet having the expansion coil or heat absorbing element as a fixture therewith—provides a construction that is well adapted for sale through the ordinary channels of trade, such as department stores for instance, without necessity of maintaining a separate service department in the different cities in which the device is sold. With the arrangement herein described of the refrigerator cabinet and the removable apparatus, repair service at the user's home is unnecessary as the apparatus, upon a defect in its operation occurring, only needs to be disconnected from the expansion coil and withdrawn from the cabinet and shipped to the manufacturer. Prior to disconnection of the apparatus from the expansion coil the shut-off valves housed in the casings 90, 91 and 92 should be closed to prevent loss of refrigerant. A new unit installed at the time of removal of the defective unit, such installation requiring a minimum of labor on the part of the workmen and thus the undesired presence of workmen in the home for considerable periods of time and the dirt and litter due to actual repair of the unit is avoided.

Having thus briefly described my invention, what I claim is—

1. In artificial refrigerating apparatus, a cabinet having a compartment for the storage of food and a fixed reentrant chamber, the exterior of which is spaced from the wall of the cabinet and the interior of which is open to atmosphere through a wall of the cabinet, an artificial refrigerating apparatus adapted for introduction into or removal from said chamber through the opening and including an electric motor and circuit therefor, a compressor, a condenser and a heat dissipating element, said cabinet being further provided with a heat absorbing element within the space between the exterior of the chamber and the cabinet walls adapted for connection with the said apparatus when positioned in said chamber, and a control switch for the motor circuit actuated through variation in temperature of the refrigerated space of the cabinet.

2. In artificial refrigerating apparatus, a cabinet having a compartment for the storage of food and provided with a reentrant chamber formed of insulated walls in fixed relation therewith and having an opening to the interior through the wall of the cabinet, said reentrant chamber providing a housing for the operating parts of a refrigerating apparatus including a heat dissipating element, and a heat absorbing element arranged as a fixture of the cabinet in the space between the exterior of the chamber and the walls of the cabinet and adapted for connection or disconnection with the complemental parts of the refrigerating apparatus.

3. In artificial refrigerating apparatus, a cabinet formed of heat insulated walls having a space therewithin to be refrigerated, a reentrant chamber formed of walls coextensive with the wall of the cabinet and having an opening through the said cabinet wall to atmosphere, and a mechanical refrigerating apparatus of the compressor-condenser-expander type, the expansion element of which is positioned on the exterior of the chamber and having terminals extending through openings to the interior of the chamber, and the compressor, condenser and heat dissipating elements of which are adapted to be positioned in or removed from the chamber through the said opening and having terminals for connection or disconnection of the expansion element terminals therewith.

4. In artificial refrigerating apparatus, a cabinet having heat insulated walls one of which is provided with an opening, a chamber formed of heat insulated walls in continuation of the wall of the cabinet about the opening and extending into the interior of the cabinet, an artificial refrigerating apparatus including a motor, a compressor and a condenser positioned in the interior of the cabinet with the motor at one side of the chamber and the compressor and condenser at the other side thereof, a fan positioned between the motor and compressor and a removable frame member for covering the opening of the cabinet wall, the said frame having a pair of openings adjacent the motor and the condenser and compressor respectively, said fan on operation of the apparatus drawing air through the opening adjacent the compressor and through and about the condenser and compressor and discharging across the motor and through the other opening.

5. In artificial refrigerating apparatus, a cabinet formed of heat insulated walls providing a space to be refrigerated, a chamber formed of heat insulated walls in fixed relation with a cabinet wall having an opening through said cabinet wall and extending into the refrigerator space near the top in spaced relation with the cabinet walls, an artificial refrigerating apparatus positioned within the chamber including means for drawing air into the chamber and discharging the same therefrom to cool the parts thereof and a heat absorbing element mounted on the exterior of the chamber walls in the refrigerated space, there being a closable opening in the cabinet wall below the opening to the chamber and leading to the refrigerated space below the chamber, and a receptacle positioned and adapted to receive moisture dripping from the heat absorbing element, said receptacle being spaced from the walls of the cabinet in a manner to provide for passage of air currents between the upper and lower portions of the refrigerated space.

In testimony whereof I sign this specification.

HOWARD L. FOSTER.